United States Patent [19]

Amao et al.

[11] Patent Number: 4,668,884
[45] Date of Patent: May 26, 1987

[54] BRUSHLESS MOTOR

[75] Inventors: Nobuyoshi Amao, Osaka; Yoshihisa Takahashi, Saitama; Hitoshi Yokomizo, Osaka, all of Japan

[73] Assignees: Sanyo Electric Co; Kumagaya Seimitsu Co., Ltd., both of Japan

[21] Appl. No.: 726,503

[22] Filed: Apr. 24, 1985

[30] Foreign Application Priority Data

Apr. 27, 1984 [JP] Japan .............................. 59-63218[U]
Jun. 4, 1984 [JP] Japan .............................. 59-83329[U]
Jun. 6, 1984 [JP] Japan .............................. 59-83953[U]
Aug. 8, 1984 [JP] Japan .......................... 59-121617[U]

[51] Int. Cl.$^4$ ........................................... H02K 11/00
[52] U.S. Cl. .................... 310/68 R; 310/42; 310/71; 310/181; 310/184; 310/156; 310/268; 310/DIG. 3; 318/254; 324/137
[58] Field of Search ............... 310/268, 42, 156, 181, 310/46, 154, 254, 71, 259, 216, 217, 68 R, 68 B, 40 MM, DIG. 3, DIG. 6, 208, 180, 184; 318/138, 254, 254 A; 324/173

[56] References Cited

U.S. PATENT DOCUMENTS

| 3,402,333 | 9/1968 | Hayner | 318/254 |
| 3,569,753 | 3/1971 | Babikyan | 310/68 R |
| 4,093,897 | 6/1978 | Fujita | 318/138 |
| 4,127,799 | 11/1978 | Nakamura | 318/138 |
| 4,167,692 | 9/1979 | Sekiya | 310/268 |
| 4,336,475 | 6/1982 | Morinaga | 310/268 |

FOREIGN PATENT DOCUMENTS 0057687 5/1981 Japan ................................ 310/156

Primary Examiner—R. Skudy
Attorney, Agent, or Firm—Darby & Darby

[57] ABSTRACT

A brushless motor (10) comprises a stator yoke plate (16) made of a magnetic material, to which both main surfaces the first and the second flexible printed circuit boards (20) (22) formed integrally including a connecting part (24) are stuck respectively. On the first flexible printed circuit board (20), a plurality of driving coils (30) are arranged annularly and a conductor pattern for a speed detecting coil is formed inside the driving coils (30). On the integrated stator yoke plate (16) and the first and second flexible printed circuit boards (20) (22), a penetrated hole (18) for passing through a rotor shaft (54) is formed generally in the center. A tongue (36) is formed generally in protrusion inwardly from the periphery defining the penetrated hole (18) on which a connecting conductor pattern connected to the speed detecting coil is formed. The tongue (36) is folded back toward the side of the second flexible printed circuit board (22) through the penetrated hole (18) and the connecting conductor pattern is connected to the second flexible printed circuit board (22). An alternating signal induced in the speed detecting coil is withdrawn from the second flexible printed circuit board (22).

22 Claims, 11 Drawing Figures

BRUSHLESS MOTOR

BACKGROUND OF THE INVENTION

1. Field of the Invention

The present invention relates to a brushless motor. More specifically, the present invention relates to an axially gapped type brushless motor used as a driving source, for example, of a rotary head of a video tape recorder and a disk player and so on.

2. Description of the Prior Art

An example of the interesting prior art brushless motor of the present invention is disclosed, for example, in U.S. Pat. No. 4,093,897 issued on June 6, 1978 or in Japanese Patent Application Laying Open No. 57687/1981 laid open on May 18, 1981. The brushless motor of the prior art as disclosed therein includes a stator and a rotor, and stator coils or driving coils are mounted on an upper surface of a stator yoke plate included in the stator and a printed circuit board is disposed on the driving coils. On the printed circuit board, there is provided a rotor magnet which is fixed to a rotor having a shaft. A rotation torque is generated on the rotor, that is on the rotary shaft by the interlinkage between the magnetic field system produced by the driving coils and the magnetic flux from the rotor magnet.

In such brushless motor of the prior art, since the printed circuit board is interposing between the driving coils and the rotor magnet, a gap therebetween is large and consequently a motor efficiency is poor. If the motor efficiency is poor, for example, a large electric current is required for the driving coils, which leads, therefore, not only to a high consumption of electric power, but also to various problems such as the requirement of circuit components endurable to such large electric current.

SUMMARY OF THE INVENTION

Therefore, it is a principal object of the present invention to provide a brushless motor capable of increasing a motor efficiency.

The brushless motor of the present invention includes a stator and a rotor, wherein the stator includes a stator yoke plate made of magnetic material. On the both main surfaces of the stator yoke plate, the first and second flexible printed circuit boards are stuck respectively. On the first flexible printed circuit board, there are provided stator coils or driving coils and a rotor magnet fixed to the rotor is disposed oppositely spaced therefrom. The first and second flexible printed circuit boards are electrically connected.

According to the invention, since only a narrow gap may be required between the driving coils and the rotor magnet, the motor efficiency can be largely improved as compared with the conventional one. In accordance with such improvement of the motor efficiency, such an advantage as the reduction in power consumption may occur.

In the preferred embodiment of the present invention, a conductor pattern as a speed detecting coil is formed on the first flexible printed circuit board inside the driving coils and connected to the second flexible printed circuit board. On the other hand, a magnetic flux providing means for providing the speed detecting coil with a magnetic flux is provided on the rotor. The electromotive force generated in the speed detecting coil is withdrawn from the second flexible printed circuit board and used for controlling the rotating speed as necessary.

According to the preferred embodiment, since the stator yoke plate is interposing between the rotor magnet and the position for withdrawing the electromotive force generated in the speed detecting coil for controlling the speed, the portion for withdrawing the electromotive force is shielded by the stator yoke plate, therefore, a superposing of the noise caused by the rotor magnet with the electromotive force (alternating signal) generated may be prevented.

If a tongue piece formed in protrusion from the first flexible printed circuit board is used as a means for connecting the speed detecting coil to the second flexible printed circuit board, and brought to be connected to a predetermined pattern of the second flexible printed circuit board by passing through a penetrated hole formed in the stator yoke plate, a configuration of means for pulling out the speed detecting coil may be simplified allowing extremely easy assembly thereof.

These objects and other objects, features, aspects and advantages of the present invention will become more apparent from the following detailed description of the embodiment of the present invention when taken in connection with the accompanying drawings.

DESCRIPTION OF THE PREFERRED EMBODIMENTS

Figure 1:
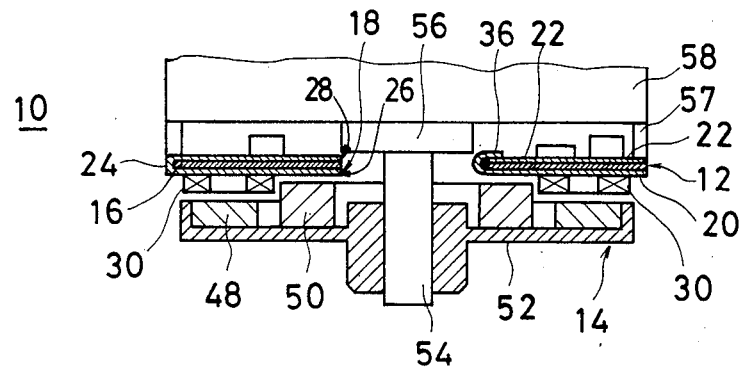
FIG. 1 is an illustrative view showing a cross section of a major portion of an embodiment of the present invention.
Figure 2:
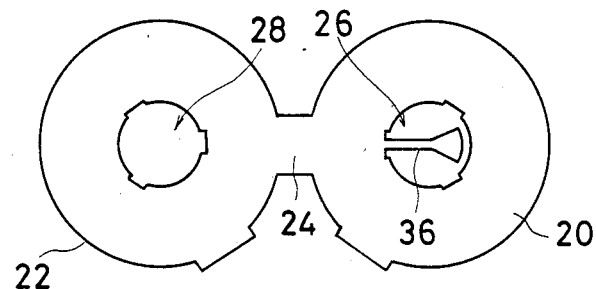
FIG. 2 is an illustrative view showing an exploded state of the first and second flexible printed circuit boards used in the embodiment.

FIG. 1 is an illustrative view showing a cross section of a major portion of an embodiment of the present invention. A brushless motor 10 comprises a stator 12 and a rotor 14. The stator 12 comprises a stator yoke plate 16 consisting of a magnetic material, for example, such as a silicon steel plate and fixed to a base 58 via a suitable spacer 57. A penetrated hole 18 is formed generally in a center of the stator yoke plate 16. The stator yoke plate 16 is provided with the first and second flexible printed circuit boards 20 and 22 respectively on the main surfaces thereof. The first and second flexible printed circuit boards 20 and 22, as shown in FIG. 2, include a connecting part 24 and formed integrally. On the flexible printed circuit boards 20 and 22 the penetrated holes 26 and 28 are formed generally in the center thereof respectively, corresponding to the penetrated hole 18 formed in the stator yoke plate 16 mentioned above. The first and second flexible printed circuit boards 20 and 22 are stuck onto the corresponding main surfaces of the stator yoke plate 16 respectively by means of adhesives or a double-sided adhesive tape and the like in such a manner, that the penetrated holes 26 and 28 will coincide with the penetrated hole 18.

Meanwhile, the flexible printed circuit boards 20 and 22, may be formed by printing or spraying conductive paint on a flexible insulating film, for example, such as a synthetic resin in accordance with the shape of the conductor pattern to be formed. However, such conductive pattern may be formed also by the other method, such as by removing unnecessary portions with the etching after forming the conductive film all over the flexible insulating film by means of non-electrolytic plating or pasting the copper foil.

Figure 3:
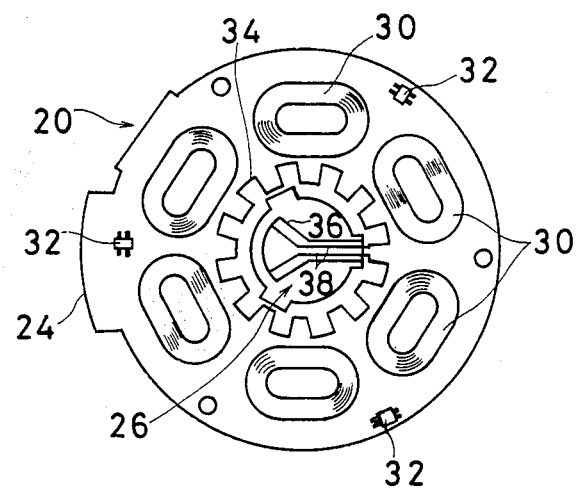
FIG. 3 is an illustrative view showing components mounted in a first flexible printed circuit board.

The first flexible printed circuit board 20 stuck onto the stator yoke plate 16 is opposing the rotor 14 as shown in FIG. 1, and six stator coils or driving coils 30 are arranged annularly thereon as shown in FIG. 3. Thus, since only the extremely thin first flexible printed circuit board 20 is interposing between the driving coils 30 and the stator yoke plate 16, the heat generated in the driving coils 30 is conducted immediately to the stator yoke plate 16 and radiated therefrom, so the extremely good radiation may be accomplished. On the first flexible printed circuit board 20, there are also provided three Hall integrated circuits (IC) 32 as the sensors for detecting the rotating position of the rotor 14 (FIG. 1). As such, the motor 10 of the embodiment comprises a three phase brushless motor. However, number of poles and phases may be designed optionally.

Furthermore, a conductor pattern (not shown) connected respectively to the terminals of the driving coils 30 and the Hall IC's 32 and constituting the predetermined circuit is formed on the first flexible printed circuit board 20. Moreover, on the first flexible printed circuit board 20, a conductor pattern for the speed detecting coil 34 is formed inside the driving coils 30 arranged annularly and on the periphery of the penetrated hole 26 in the center thereof. A tongue piece 36 is formed in protrusion inwardly from the periphery defining the penetrated hole 26 of the first flexible printed circuit board 20, and provided with a connecting conductor pattern 38 extending from both ends of the speed detecting coil 34.

Figure 4:
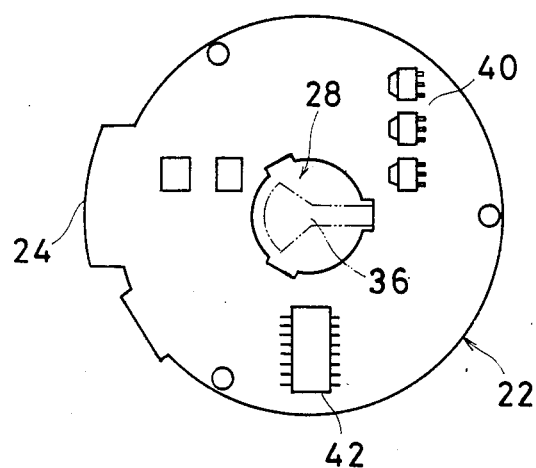
FIG. 4 is an illustrative view showing components mounted on a second flexible printed circuit board.

On the second flexible printed circuit board 22 stuck onto the stator yoke plate 16, although not shown, there are provided a conductor pattern constituting the predetermined circuit connection. Meanwhile, three transistors 40 and IC 42 for controlling the power supply to the driving coils 30 (FIG. 3) in cooperation with these transistors 40 are mounted on the second flexible printed circuit board 22 as shown in FIG. 4, which are, with the conductor pattern mentioned above, constituted as a circuit as shown, for example, in FIG. 5 of U.S. Pat. No. 4,043,897. Since such control circuit is well known, the detailed description thereof will be omitted.

Figure 5:
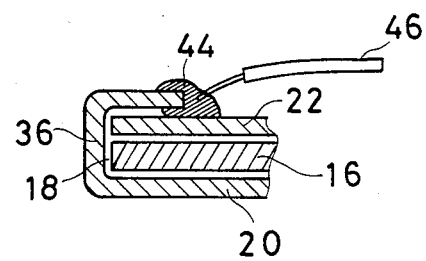
FIG. 5 is a partially enlarged view showing a structure for connecting a tongue piece extending from a speed detecting coil of a first flexible printed circuit board to a second flexible printed circuit board.

Furthermore, after the first and second flexible printed circuit boards 20 and 22 being stuck onto the stator yoke plate 16, the tongue piece 36 is folded back through the penetrated hole 18 of the stator yoke plate 16 and drawn out on the predetermined conductor pattern (not shown) of the second flexible printed circuit board 22. Then the connecting conductor pattern 38 FIGS. 2 and 3 formed on the tongue piece 36 is electrically connected and mechanically fixed to the conductor pattern of the second flexible printed circuit board 22. The connected state thereof is shown in FIG. 5. To a connecting part 44 of the tongue piece 36 there is connected a lead wire 46, which is, therefore, connected to the speed detecting coil 34 formed on the first flexible printed circuit board 20 via the connecting part 44 and the connecting conductor pattern 38 of the tongue piece 36.

The rotor 14 shown in FIG. 1 includes an annular rotor magnet 48 opposing the driving coils 30 mounted on the first flexible printed circuit board 20 stuck onto the lower surface of the stator yoke plate 16, via a gap formed in an axial direction. As such, since only the extremely narrow air gap is interposing between the rotor magnet 48 and the driving coils 30, a large improvement of the motor efficiency can be expected as compared with the motor of the prior art. The rotor 14 also includes a ring-shaped magnet 50 opposing the speed detecting coil 34 formed on the first flexible printed circuit board 20, inside the rotor magnet 48. Thus, by forming the speed detecting coil 34 inside the driving coils 30 on the first flexible printed circuit board 20, while arranging the generator magnet 50 inside the rotor magnet 48, such problem as the reduction of rotation torque and the irregular rotation of the rotor 14 influenced by the driving coils 30 may be avoided, thereby the more compact brushless motor can be obtained. The magnets 48 and 50 are both constituted as the disk-shaped multi pole magnets having the heteropolar being formed reciprocally in the circumferential direction thereof and magnetized in the direction of the thickness (axially), wherein the size of magnetic section is formed densely for the magnet 50 than the rotor magnet 48.

The rotor 14 comprises a disk-shaped case 52 to which these magnets 48 and 50 are fixed and a rotor shaft 54 is fixed generally in the center of the case 52. The rotor shaft 54 is connected to a bearing holder 56 which is mounted on a base 58 opposing a driven member (not shown). Accordingly, when the rotor 14 is rotated by the reciprocity of the driving coils 30 and the rotor magnet 48, the driven member is rotated. In accordance with the rotation, the magnetic fluxes of each magnetic section of the magnet 50 interlink successively with the speed detecting coil 34 and an alternating signal is generated from the speed detecting coil 34. The alternating signal is withdrawn from the lead wire 46 connected to the second flexible printed circuit board 22. The alternating signal is used for controlling the rotation speed of the rotor 14 in the same manner as in the previously cited U.S. Patent.

Meanwhile, in the embodiment in FIG. 1, a tongue piece 36 disposed separately was used for drawing out or connecting the speed detecting coil 34 (FIG. 3) to the reverse side of the stator 12, that is, to the second flexible printed circuit board 22. However, such tongue piece is not particularly needed, the connecting part 24 shown in FIG. 2 may be used for double purpose. In other words, the tongue piece 36 can be eliminated, by making the connecting part 24 serve the dual purpose of (1) electrically connecting the conductor patterns of the first and second flexible printed circuit boards 20 and 24, and (2) withdrawing the electromotive force generated by the speed detecting coils 34.

Figure 6:
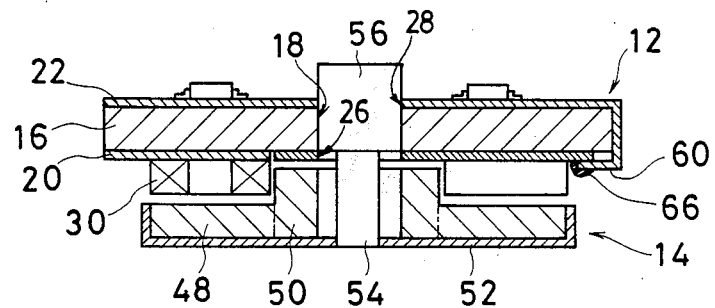
FIG. 6 is an illustrative view showing a cross section of a major portion of another embodiment of the present invention.
Figure 7:
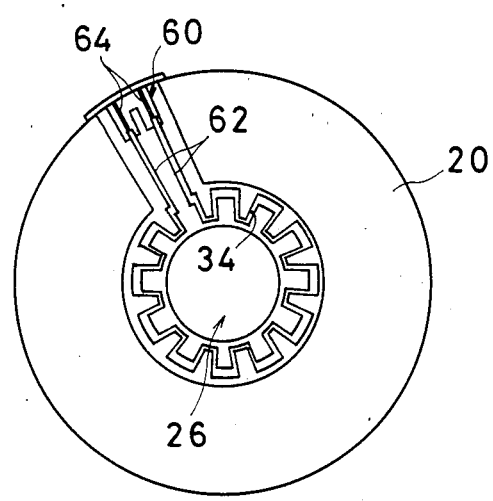
FIG. 7 is an illustrative view showing a manner of connection of a speed detecting coil in the embodiment.

FIG. 6 is an illustrative view showing a cross section of a major portion of another embodiment of the present invention, which differs from the embodiment in FIG. 1 on the following points. More specifically, on both main surfaces of the stator yoke plate 16 of the brushless motor 10 shown in FIG. 6, a separate first and second flexible printed circuit boards 20 and 22 are stuck respectively. On the second flexible printed circuit board 22, there is formed a tongue piece 60 protruding outwardly from the periphery thereof, which is folded back along the side of the stator yoke plate 16 and connected onto the first flexible printed circuit board 20. On the first flexible printed circuit board 20, the speed detecting coil 34 is formed on the periphery defining the penetrated hole 26 as shown in FIG. 7 and the both ends thereof are connected to a connecting conductor pattern 62 formed on the first flexible printed circuit board 20. While, a connecting conductor pattern 64 is formed also on the tongue piece 60, and these two conductor patterns 62 and 64 are connected together at the connecting part 66 as shown in FIG. 6.

Figure 8:
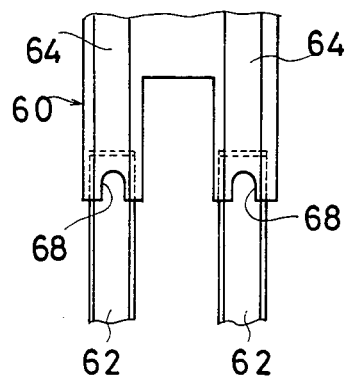
FIGS. 8 and 9 are partially enlarged views showing different examples of the connecting portions in FIG. 7, respectively.
Figure 9:
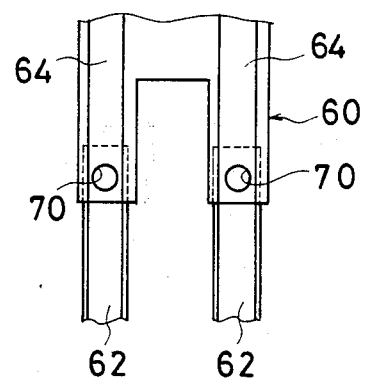

As shown enlarged in FIG. 8 or FIG. 9, the tongue piece 60 comprises a notch 68 or an aperture 70 formed at the tip thereof. Such notch 68 or aperture 70 are disposed on the conductor pattern 64 of the tongue piece 60 and positioned so as to correspond with the connecting conductor pattern 62 of the first flexible printed circuit board 20 and connected by means of soldering in that state.

As such, by forming the notch 68 or the aperture 70 on the tip or the connecting part of the tongue piece 60, a contacting area on the connecting part 66 with the solder will be increased, allowing more firm connection between the connecting conductor pattern 64 of the tongue piece 60 and the connecting conductor pattern 62 of the first flexible printed circuit board 20.

Contrary to the embodiment in FIG. 6, the tongue piece 60 may be extended from the first flexible printed circuit board 20 and drawn out to the second flexible printed circuit board 22.

Furthermore, in the embodiment, the magnets 48 and 50 may be of a separate type as same as of the embodiment in FIG. 1 instead of an integrated one as shown in FIG. 6.

Figure 10:
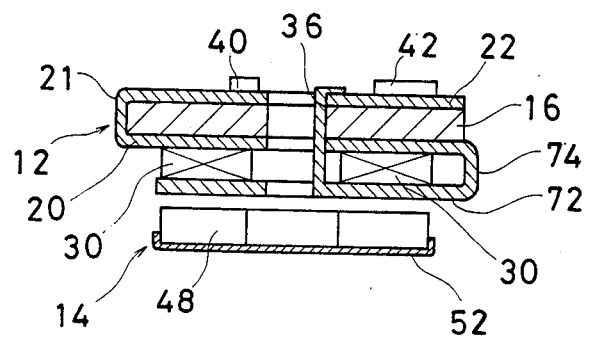
FIG. 10 is an illustrative view showing a cross section of a major portion of another embodiment of the present invention.
Figure 11:
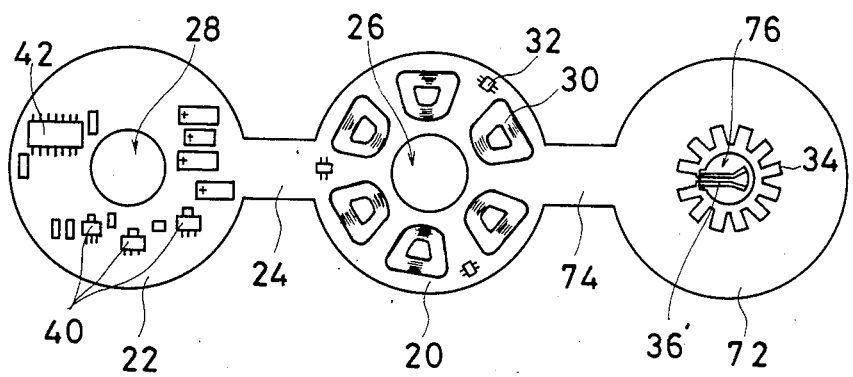
FIG. 11 is an illustrative view showing exploded states of first, second and third flexible printed circuit boards of the embodiment.

FIG. 10 is an illustrative view showing a cross section of a major portion of another embodiment of the present invention, which is similar to the embodiment in FIG. 1 with the exception of the following points. The motor 10 comprises a third flexible printed circuit board 72 which is formed integrally with the first and second flexible printed circuit boards 20 and 22 including the connecting parts 24 and 74. As same as the embodiment in FIG. 1, the first and second flexible printed circuit boards 20 and 22 are stuck onto the both main surfaces of the stator yoke plate 16, the driving coils 30 are mounted on the first flexible printed circuit board 20 and electronic components such as the transistors and IC's are arranged on the second flexible printed circuit board 22. The third flexible printed circuit board 72 is further folded back on the driving coils 30 and stuck onto the upper surface thereof. Different from the previous embodiment, the speed detecting coil 34 is formed not on the first flexible printed circuit board 20 but on the third flexible printed circuit board 72. A tongue piece 36' is extended from the third flexible printed circuit board 72 as same as in the previous embodiment in FIG. 1, which is drawn out on the second flexible printed circuit board 22 through a penetrated hole 76 and connected thereat. Accordingly, the speed detecting coil 34 formed on the third flexible printed circuit board 72 is connected to the second flexible printed circuit board 22 through the tongue piece 36' and the alternating signal induced in the speed detecting coil 34 is withdrawn from the second flexible printed circuit board 22.

Thus, if the third flexible printed circuit board 72 is interposed between the driving coils 30 and the rotor magnet 48, the rotor magnet 48 may be used also as the generator magnet (corresponding to the magnet 50 in the embodiment in FIG. 1). Meanwhile, since the third flexible printed circuit board 72 is extremely thin such a trouble as the gap between the driving coils 30 and the rotor magnet 40 becoming excessively large does not occur.

Although the present invention has been described and illustrated in detail, it is clearly understood that the same is by way of illustration and example only and is not to be be taken by way of limitation, the spirit and scope of the present invention being limited only by the terms of the appended claims.

What is claimed is:

1. A brushless motor comprising:
a stator yoke plate made of a magnetic material,
first and second flexible printed circuit boards stuck onto the both main surfaces of said stator yoke plate,
driving coils disposed on said first flexible printed circuit board,
a rotor,
a rotor magnet disposed on said rotor and opposing said driving coils via a predetermined gap and being divided into a plurality of sections in the circumferential direction thereof, each of said sections being magnetized in alternating polarity, and
connecting means for electrically connecting said first and second flexible printed circuit boards.

2. A brushless motor in accordance with claim 1, wherein said connecting means includes a connecting portion for connecting said first flexible printed circuit board integrally with said second flexible printed circuit board, which are folded back and stuck respectively onto the main surfaces of said stator yoke plate corresponding thereto.

3. A brushless motor in accordance with claim 2, which further comprises a speed detecting coil and magnetic flux providing means disposed on said rotor for providing said speed detecting coil with the magnetic flux.

4. A brushless motor in accordance with claim 3, wherein said magnetic flux providing means includes said rotor magnet.

5. A brushless motor in accordance with claim 3, wherein said magnetic flux providing means includes a magnet ring disposed at a position opposing said speed detecting coil on said rotor and being divided into a plurality of sections in the circumferential direction thereof, each of said sections being magnetized with alternating polarity.

6. A brushless motor in accordance with claim 5, wherein said speed detecting coil is disposed inside said driving coils and said magnet ring is arranged inside said rotor magnet.

7. A brushless motor in accordance with claim 3, which further comprises coil connecting means for connecting said speed detecting coil to said second flexible printed circuit board, and means for electrically connected said speed detecting coil to said second flexible printed circuit board through said coil connecting means.

8. A brushless motor in accordance with claim 7, wherein a penetrated hole is formed generally in the center of an integrated body of said stator yoke plate, said first and second flexible printed circuit boards, and said coil connecting means includes a tongue piece formed in protrusion from the periphery defining said penetrated hole of said first flexible printed circuit board, which is folded back through said penetrated hole and connected to said second flexible printed circuit board.

9. A brushless motor in accordance with claim 8, which further comprises circuit components mounted on said second flexible printed circuit board for controlling the power supply to said driving coils.

10. A brushless motor in accordance with claim 1, which further comprises circuit components mounted on said second flexible printed circuit board for controlling the power supply to said driving coils.

11. A brushless motor in accordance with claim 1, which further comprises a speed detecting coil, magnetic flux providing means disposed on said rotor for providing said speed detecting coil with magnetic flux, coil connecting means for connecting said speed detecting coil to said second flexible printed circuit board, and means for withdrawing the electromotive force generated in said speed detecting coil and led to said second flexible printed circuit board through said coil connecting means.

12. A brushless motor in accordance with claim 11, wherein said coil connecting means includes a tongue piece drawn out from either to other of said first and second flexible printed circuit board.

13. A brushless motor in accordance with claim 12, wherein said tongue piece includes a connecting portion, on which either a notch or an aperture is formed for insuring the connection thereof.

14. A brushless motor in accordance with claim 2, which further comprises a third flexible printed circuit board which is coupled to said first flexible printed circuit board and folded back on said driving coils.

15. A brushless motor in accordance with claim 14, which further comprises a speed detecting coil disposed on said third flexible printed circuit board and magnetic flux providing means for providing said speed detecting coil with magnetic flux.

16. A brushless motor in accordance with claim 15, wherein said magnetic flux providing means includes said rotor magnet.

17. A brushless motor in accordance with claim 15, which further comprises circuit components mounted on said second flexible printed circuit board for controlling the power supply to said driving coils.

18. A brushless motor in accordance with claim 15, which further comprises coil connecting means for connecting said speed detecting coil to said second flexible printed circuit board, and means for withdrawing the electromotive force generated in said speed detecting coil and led to said second flexible printed circuit board through said coil connecting means.

19. A brushless motor comprising;
a stator yoke plate made of a magnetic material,
first and second flexible printed circuit boards secured onto both main surfaces of said stator yoke plate, respectively,
driving coils disposed on said first flexible printed circuit board,
a rotor,
a rotor magnet disposed on said rotor and opposing said driving coils via a predetermined gap and being divided into a plurality of sections in the circumferential direction thereof, each of said sections being magnetized in alternating polarity, and
connecting means for electrically connecting said and second flexible printed circuit boards, wherein said connecting means includes a connecting portion for connecting said first flexible printed circuit board integrally with said second flexible printed circuit board, which are folded back and secured respectively onto the main surfaces of said stator yoke plate corresponding thereto.

20. A brushless motor comprising;
a stator yoke plate made of a magnetic material,
first and second flexible printed circuit boards secured onto both main surfaces of said stator yoke plate,
driving coils disposed on said first flexible printed circuit board,
a rotor,
a rotor magnet disposed on said rotor and opposing said driving coils via a predetermined gap and being divided into a plurality of sections in the circumferential direction thereof, each of said sections being magnetized in alternating polarity,
connecting means for electrically connecting said first and second flexible printed circuit boards, wherein said connecting means includes a connecting portion for connecting said first flexible printed circuit board integrally with said second flexible printed circuit board, which are folded back and secured respectively onto the main surfaces of said stator yoke plate corresponding thereto, and
a speed detecting coil and magnetic flux providing means disposed on said rotor for providing said speed detecting coil with magnetic flux, wherein said magnetic flux providing means includes said rotor magnet.

21. A brushless motor comprising;
a stator yoke plate made of a magnetic material,
first and second flexible printed circuit boards secured onto the both main surfaces of said stator yoke plate,
driving coils disposed on said first flexible printed circuit board,
a rotor,
a rotor magnet disposed on said rotor and opposing said driving coils via a predetermined gap and being divided into a plurality of sections in the circumferential direction thereof, each of said sections being magnetized in alternating polarity,
connecting means for electrically connecting said first and second flexible printed circuit boards, and
circuit component means mounted on said second flexible printed circuit board for controlling the power supplied to said driving coils.

22. A brushless motor comprising;
a stator yoke plate made of a magnetic material, first and second flexible printed circuit boards secured onto the both main surfaces of said stator yoke plate, driving coils disposed on said first flexible printed circuit board, a rotor, a rotor magnet disposed on said rotor and opposing said driving coils via a predetermined gap and being divided into a plurality of sections in the circumferential direction thereof, each of said sections being magnetized in alternating polarity, connecting means for electrically connecting said first and second flexible printed circuit boards, and a speed detecting coil, magnetic flux providing means disposed on said rotor for providing said speed detecting coil with magnetic flux, coil connecting means for connecting said speed detecting coil to said second flexible printed circuit board, and means for withdrawing the electromotive force generated in said speed detecting coil and led to said second flexible printed circuit board through said coil connecting means, wherein said coil connecting means includes a tongue piece drawn out from either to the other of said first and second flexible printed circuit boards.

* * * * *